June 6, 1950  C. W. SCHRAMM  2,510,299
PULSE-ECHO TESTING SYSTEM
Filed Jan. 1, 1945  3 Sheets-Sheet 1

INVENTOR
C. W. SCHRAMM
BY E. V. Griggs
ATTORNEY

June 6, 1950     C. W. SCHRAMM     2,510,299
PULSE-ECHO TESTING SYSTEM

Filed Jan. 1, 1945     3 Sheets-Sheet 2

INVENTOR
C. W. SCHRAMM
BY
E. V. Griggs
ATTORNEY

June 6, 1950   C. W. SCHRAMM   2,510,299
PULSE-ECHO TESTING SYSTEM
Filed Jan. 1, 1945   3 Sheets-Sheet 3

INVENTOR
C. W. SCHRAMM
BY
E. V. Griggs
ATTORNEY

Patented June 6, 1950

2,510,299

UNITED STATES PATENT OFFICE 2,510,299

PULSE-ECHO TESTING SYSTEM

Charles W. Schramm, Nutley, N. J., assignor to Bell Telephone Laboratories, Incorporated, New York, N. Y., a corporation of New York Application January 1, 1945, Serial No. 570,885

8 Claims. (Cl. 343—5)

This invention relates to testing systems and more particularly to apparatus and systems for testing object locators.

An object of the invention is to facilitate adjustment and tuning of the various elements of an object locator system of the type which utilizes the interval between transmission of a pulse of electromagnetic waves and the receipt of the pulse echo as reflected from a remote body.

Before an object locator is put into use for searching or for distance-measuring purposes, it is necessary to make a routine test to insure that it is functioning properly. Such a test should determine that the local radio receiver which is to receive the echo pulse is in tune with the local transmitter from which the original pulse was emitted. It should also determine that the circuits both of the radio transmitter and the radio receiver are otherwise in such adjustment that a reasonably good echo will be indicated from a target within normal range of the apparatus. It should further show that the cathode ray oscillograph (CRO) apparatus is adjusted to give a satisfactory visual indication. However, in the case of object locators of mobile type such as those on ships or airplanes, it may transpire that at the time for testing the equipment no convenient target is available. Airborne object locators are generally unenergized until some time after take-off of the aircraft because of the large electrical drain on the plane's power supply system. An interval elapses after the power is turned on for warming the equipment, during which adjustments may be required to keep the receiver in tune with the transmitter. After adequate frequency stability has been reached a check of the range capabilities is desirable. During all this time, the airplane may have traveled far enough, particularly if headed out to sea so that real targets are no longer discernible. For such circumstances it has been proposed to provide a so-called "phantom target" which may constitute an adjunct of the object locator or may be placed at some position close to the locator to serve in lieu of an actual target. Such a phantom target may comprise a resonant chamber of conducting material having a high resonance persistence or high Q. An energy pick-up device such as a small dipole may be located within the field of the pulses transmitted from the radio transmitter and may be coupled by an energy transfer path to the interior field of the resonance chamber. During emission by the object locator transmitter of a brief transmitted pulse the resonant chamber will be excited to an extent dependent upon the intensity of the emitted pulse and the proximity of a resonance frequency of the chamber to the frequency of the oscillations of the transmitter pulse. Upon cessation of the impulse, the energy which has been stored up in the electromagnetic field within the resonant chamber serves as a source of oscillations. Some of this energy is returned by the resonant chamber over the path by which it arrived to the pick-up device or dipole, which now functions as a radiating transmitting element from which oscillation energy may be transmitted to the radio receiver of the object locator.

A strong internal electromagnetic field may be built up by resonance within the resonance chamber if the chamber has a very high oscillation persistence or high Q, as it is usually termed. This corresponds to a condition of high selectivity in which the chamber responds effectively only to electromotive forces within a comparatively narrow frequency range. As it may happen that the transmitter oscillation frequency drifts over a relatively wide range, it is desirable to provide the narrow range resonance chamber with a tuning device which will permit the region of its resonance response to be varied. In most applications of this apparatus it is desirable to place the resonance chamber in close physical proximity to the radiating antenna of the object locator and within the zone to which that antenna radiates pulse energy. This frequently requires that the resonance chamber be placed in the nose of the airplane or beneath a wing, or in some other location remote from the operator of the locator apparatus. It has therefore been found desirable to provide the resonance chamber with a remotely controlled motor-driven tuner which causes its tuning to vary over the entire expected range of frequency variation of the radio transmitter. The tuner should operate slowly enough to permit the exploration of each azimuth direction while the scanning devices change the azimuth direction, but it should operate rapidly enough to enable the necessary tests to be made with a minimum of loss of useful search time on the part of the object locator.

Two somewhat different types of cathode ray oscilloscope may be employed to portray the reflected pulse which is the received echo of the pulse sent out from the radio transmitter. If the scanning device is to operate over a small arc of azimuth, a type B oscilloscope, as for example, that disclosed in United States Patent No. 2,422,182, issued to N. W. Bryant on June 17, 1947, is convenient. Such an oscilloscope indicates the receipt of the echo by a luminous spot having an ordinate corresponding to the distance of the reflecting object and an abscissa corresponding to the azimuth angle of the reflecting object. If, however, the scanning device is to operate over the entire horizon, a so-called plan position indicator is preferable. This differs from the type B oscilloscope in that it is provided with a circular screen and that polar rather than orthogonal coordinates of the luminous spot indicate the distance and direction of the reflecting object. Distance is, of course, represented by the position of the spot along a radius from the center and azimuth angle is represented by the angular position of that particular radius. Both the type B oscilloscope and the plan position indicator are well-known devices in the art of object location.

A phantom target resonance chamber energized by an impulse from the radio transmitter will begin to return energy to the radio receiver immediately upon the cessation of the energizing impulse. This will give rise on the oscilloscope to a luminous spot corresponding to zero distance. As the resonance chamber continues to return energy to the radio receiver, there is built up on the screen of the oscilloscope a succession of spots which merge into a vertical trace or spire in the case of the type B oscilloscope or a radial spire in the plan position indicator. The longer the oscillation of the resonance chamber persists the longer is the trace or spire produced thereby. Accordingly, the height of such a spire is an index of the overall effectiveness of the object locator system in building up an electromagnetic field within the resonance chamber and receiving and indicating at the oscilloscope energy returned from the resonance chamber.

A number of factors are involved in the production of a spire or trace on the oscilloscope. Of course, the radio transmitter must be active so as to emit a pulse of microwaves which the resonance chamber may receive and later return to the radio receiver. The position of the pick-up element of the resonance chamber must be within the zone to which energy is radiated by the transmitting antenna. At some time when a pulse of microwaves is being radiated from the radio transmitter, the instantaneous resonance frequency of the resonance chamber must agree with the frequency of the microwaves. The radio receiver must also be tuned at approximately the frequency of the microwaves which it is to receive from the resonance chamber. From what has been said, it will be apparent that any improvement in the adjustment of the radio transmitter or its outgoing circuit to increase its efficiency will increase the energy received by the resonance chamber. Any improvement in the efficiency of the energy pick-up of the resonance chamber or its connections to the chamber will likewise increase the energy received by the resonance chamber and the energy which it returns upon cessation of the energizing pulse. Any improvement in the tuning of the radio receiver or of its gain, or noise level, will likewise increase the length of the visible portion of the trace on the oscilloscope. It is therefore possible with the apparatus of this invention not only to determine if the object locator transmitter is active and that the locator as a whole is operative, but also to determine what adjustments in each of the individual components of the entire system are helpful in improving its efficiency.

The azimuthal scanning ordinarily takes place at a relatively low rate, as for example, one cycle per second. Since the pulses or microwave trains emitted by the radio transmitter of the object locator are ordinarily of a relatively high rate, as for example, 2,000 pulses per second, the azimuthal drift or sweep of the oscilloscope cathode ray beam is sufficiently slow that it may to a rough approximation be considered as substantially stationary at each of the azimuth positions. The radiated pulses occur in such rapid sequence that for practical purposes it may be considered that one is sent out for each azimuthal direction. Assume that the radio transmitter and the radio receiver are properly energized, the scanning device is in operation and the resonance chamber of the phantom target is within the zone to which energy is radiated from the transmitter. As soon as the scanning apparatus arrives at the position in which energy from the radio transmitter is being received from the pick-up device associated with the resonance chamber, the electromagnetic field within the resonance chamber will begin to build up rapidly, provided that the resonance chamber is at that moment in tune with the incoming oscillations. Since the resonance frequency of the resonance chamber is varied cyclically by the motor-driver tuner, it will attain the sought-for transmitted microwave frequency once while increasing in frequency and a second time while decreasing in frequency. At these two instants spires will appear on the cathode ray oscilloscope associated with the object locator receiver. The traces will accordingly appear in a few sets of pairs, one pair representing each tuning cycle of the resonant chamber and the amplitude of the traces increasing from the instant when the position of the pick-up device permits it to be effective and thereafter passing through a maximum and finally back to zero at the point where the position on the take-up no longer permits it to be effective. This pattern reoccurs as long as the test is continued, but it is a moving pattern since the points at which the tuning of the resonance chamber agrees with the transmitter frequency bear no definite relation to the angular position of the scanning device.

According to the present invention, the tuning of the resonance chamber and the scanning motion of the radio transmitter antenna are so related by a mechanical coupling between the tuning device and the scanning device that the pattern tends to remain stationary. This gives rise to several advantages among which are ability to set the mean resonance frequency of the resonance chamber at the transmitter frequency; the ability to quickly determine whether or not the transmitter frequency is changing relative to the tuning of the radio receiver and a simplification of the entire system required to tune the object locator transmitter while it is on the ground. In cases where the trace representing an actual target tends to be faint, the fixing of the pattern tends to widen the trace and brighten it, thus minimizing errors. Moreover, since the apparatus may be so aligned at the outset as to produce a pair of traces from the phantom target which are nicely centered with reference to the azimuth zero, it is possible to check the position of the scanning device or the "spinner," as it is called, with reference to the field of the oscilloscope. This apparatus also makes it possible to secure consistent results irrespective of the speed of the scanning device so that a single type of apparatus may be utilized for various scanning speeds and results may be made fairly independent of variations in the scanner speed.

Figure 1:
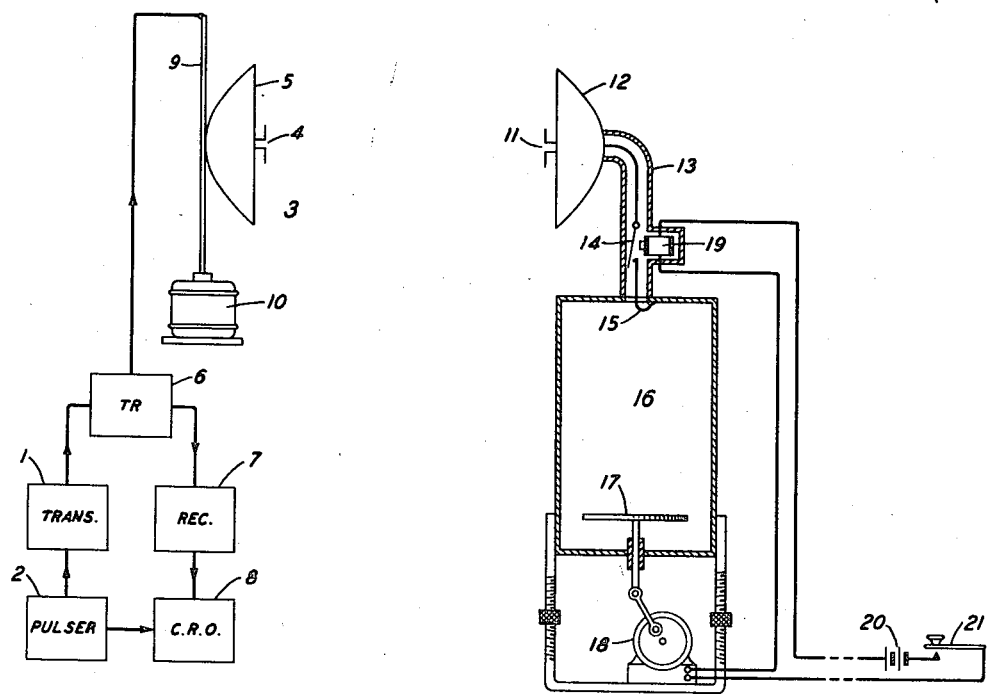
Fig. 1 illustrates diagrammatically a system including a radio object locator and a phantom target associated to form a test system.

Referring to Fig. 1, the radio object locator comprises a radio transmitter 1 for producing oscillations of extremely high frequency, as, for example, 1 to 30 centimeters' wavelength in response to short pulses of energy supplied to it by the pulser 2. The output of the transmitter 1 may be connected to a rotatable searching antenna 3 comprising a dipole 4 associated with a directive parabolic reflector 5. The antenna dipole 4 is connected to the output of the transmitter 1 through a transmit-receive switch 6 which may be of the type disclosed and claimed in the application Serial No. 474,122, filed January 30, 1943, for Transmitting and receiving circuits for wave transmission systems, by A. L. Samuel, the function of which is to effectively connect the transmitter 1 and the radio receiver 7 of the object locator in alternation to the dipole 4. During an energy pulse from the pulser 2 which may be of a microsecond's duration, transmitter 1 produces oscillations for a corresponding period and impresses them upon switching device 6 from which they are transferred to the dipole 4 and directively radiated thereby. During the pulse, the device 6 serves effectively to disable the connection to radio receiver 7 to such a degree as to protect it and its associated apparatus including the cathode ray oscilloscope 8 from inordinate overloads. Upon cessation of the pulse, the device 6 returns to its original condition and freely permits energy of microwaves incoming to dipole 4 to pass to the radio receiver 7 while maintaining the impedance presented by transmitter 1 too high to seriously attenuate the incoming energy. The initiation of a pulse by pulser 2 serves in a manner well known in the art to initiate a vertical or radial time sweep as the case may be in the cathode ray oscilloscope 8.

The dipole 4 and the reflector 5 of the searching antenna 3 may be mounted for azimuthal scanning rotation or oscillation upon a suitable shaft 9 driven in rotary or oscillatory motion by a motor 10.

The phantom target may comprise a dipole pick-up 11 associated with a directive parabolic reflector 12 and connected to a coaxial line 13 which extends to a circuit closer 14, shown diagrammatically as of the ordinary electromagnetic relay type. When the circuit closer is closed, it connects the coaxial system 13 to a coupling loop 15 projecting within a resonance chamber 16, which is provided with a variable position plunger tuner 17 driven in vertically reciprocating manner by a piston rod and crank connection operated by a motor 18 in circuit with a winding 19 of the circuit closer 14, a source 20 and a normally open key 21. The resonance chamber 16 and its tuner 17 are so designed and adjusted that during the excursion of the tuner plunger 17 from its uppermost position to its lowermost position the natural resonance frequency of the resonance chamber 16 traverses the entire band of frequencies which the radio transmitter 1 is capable of transmitting. As indicated in the drawing, the base of the motor 18 is supported by a framework slung from the resonance chamber 16 and provided with screw adjusting devices to vary the normal position of the motor 18 with reference to the resonance chamber 16 so as to permit a manual shift of the band of resonance frequencies through which the device 16 may be tuned.

Figure 2:
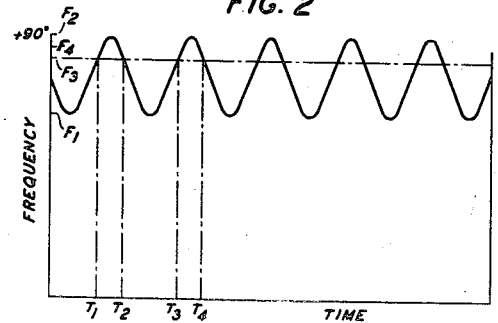
Figs. 2, 3 and 4 are graphs to aid in the explanation of the operation of the system of Fig. 1.

Assume that the object locator has been energized and that the key 21 is closed but that the output of the transmit-receive switch 6 is, contrary to the disclosure of Fig. 1, connected by an invariable conducting circuit to the coaxial line 13 so that the successive pulses received from the transmitter 1 by the resonance chamber and returned by it to the receiver 7 are of equal intensity. Assume further that the tuning of the resonance chamber 16 is being varied in a generally sinusoidal manner between the frequencies $F_1$ and $F_2$ as indicated in the graph of Fig. 2. If the frequency of the pulse oscillations sent out by transmitter 1 is at an intermediate point $F_3$, the varying frequency resonance chamber 16 will agree in frequency with the incoming oscillations and will build up a strong internal field and send a return pulse back to receiver 7 at instants corresponding to $T_1$, $T_2$, $T_3$, and $T_4$, respectively. If the receiver 7 be in substantial frequency agreement with the transmitter 1, these echo pulses returning from resonance chamber 16 will appear on the screen of cathode ray oscilloscope 8 when this apparatus is a type B oscilloscope, as the equal height spires $P_1$, $P_2$, $P_3$, and $P_4$, illustrated in Fig. 3 of the drawing, in which the coordinates or heights of the spires represent the effective echo period or ring time of the resonance chamber 16 and the abscissae represent position in the time cycle or scanning position of the rotatable searching antenna 3.

Figure 3:
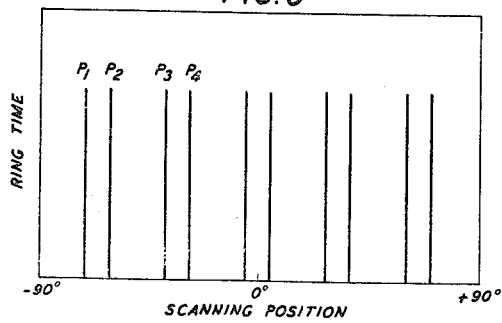
Figure 4:
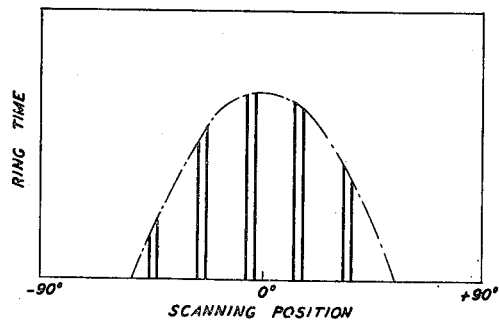

In the actual searching operation, instead of the constant height spires of Fig. 3 of the invariable connection which has been assumed between the transmitting circuit and the pick-up circuit 11, there is a directive pattern, as indicated by Fig. 4. Up to the point in which the field of the energy transmitted from antenna 4 effectively includes the pick-up antenna 11, no spires will appear on the cathode ray oscillograph. As the directive searching antenna 3 approaches alignment with the fixed directive pick-up antenna, the spires increase in height to a maximum when the transmission is most effective and thereafter decrease. The change in height of the spires from each pair to the next succeeding pair indicates the change in the strength of the field to which the pick-up antenna 11 is subjected as the searching antenna 4 swings in direction toward and away from it.

Whatever the frequency of the transmitter, so long as it remains at some point intermediate the limiting frequencies $F_1$ and $F_2$, there will be two effective times of energization of the resonance chamber 16, one corresponding to that in which the tuning piston 17 is moving upward and the other corresponding to the same position of the piston 17 when it is moving downward. The responses of the resonance chamber 16 therefore occur in pairs, one pair for each cycle of the movement of the tuning piston. The separations in time between the pulses of the same pair and between pulses of contiguous pairs are equal when the frequency of the transmitter 1 and the mean frequency of the resonance chamber 16 coincide. If the transmitter frequency changes to some other frequency, as, for example, F4, pulses P1 and P2 of the first pair, will approach each other as will also pulses P3 and P4. However, pulses P2 and P3 of contiguous pairs will recede from each other, thus indicating that the mean frequency of the resonance chamber 16 is deviating still farther from the transmitter frequency.

The fact that the individual spires of a pair are closer to each other than they are to the next adjacent spire of a contiguous pair is an indication that the frequency F3 of the transmitter is not midway between the limiting frequencies F1 and F2. Manual adjustment of the position of the motor base 18 by manipulation of the screw adjusting devices will indicate immediately the direction of the adjustment needed to more widely space the spires of an individual pair. It is accordingly possible by adjusting the apparatus until all of the spires are equally spaced to cause the mid-frequency of the band of frequencies through which resonance chamber 16 is varied to substantially coincide with the frequency of the oscillations produced by transmitter 1.

Figure 5:
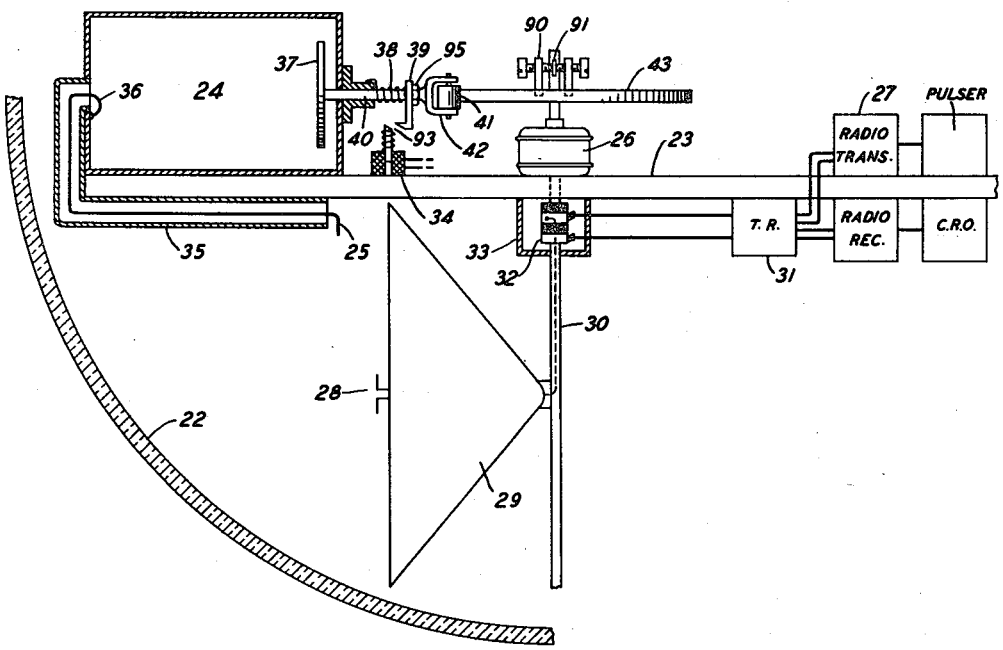
Fig. 5 is a schematic of an embodiment of the invention in an airborne structure.
Figure 6:
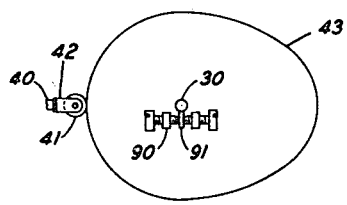
Fig. 6 is a plan view of the cam and cam follower of Fig. 5.

Fig. 5 illustrates an embodiment of the present invention in which the tuning of the resonance chamber of the phantom target and the searching motion of the object locator transmitter are controlled by the same motor. In this figure, the apparatus is shown mounted in the nose or in a turret 22 of an aircraft. A shelf support 23 carries a resonance chamber 24, a vertical shaft motor 26 and a radio transmitter 27, together with its associated radio receiver, pulser, and cathode ray oscilloscope. The resonance chamber 24 is connected through a coupling loop 36 and coaxial conductor 35 with a stationary pick-up 25 of half dipole or any other suitable type positioned to receive energy from a searching transmitter dipole transmitter 28 mounted together with its parabolic reflector 29 on the vertical shaft 30 of motor 26. The circuits from the radio transmitter 27 and the radio receiver pass as in the disclosure of Fig. 1, through a transmit-receive switch 31 to the dipole antenna 28. Although any desired means may be used for connecting the moving dipole to the stationary conductors of the radio apparatus, there is illustrated in this figure a coaxial structure leading from the dipole 28 through the shaft 30 to the rotating joint 32 enclosed in the shield 33 and connected to the output terminals of the transmit-receive switch 31. As in Fig. 1, the energization of motor 26 may be controlled by remote control switch in circuit with the motor and with the winding 34 of a releasing latch, release of which permits the movable tuning element of the chamber 24 to be operated.

During energization of the apparatus, including the transmitter, the receiver and the motor 26, shaft 30 is rotated at a constant speed to cause the transmitter antenna 28, 29 to scan the entire 360 degrees. By application of a blanking electromotive force to a grid of the CRO tube during the rearward half of the search scanning cycle, any effect of the transmitter pulses which would otherwise occur during that period may be prevented from giving an indication on the CRO device.

In the system of Fig. 1, it is desirable to vary the tuning of the resonance chamber 16 at fairly high speed with reference to the time cycle of the scanning device, in order to insure that the entire tuning range be covered a number of times. One reason for this is that in the endeavor to obtain optimum adjustment of the apparatus the longest spire is being sought and although the conditions for that spire may otherwise be satisfactory, it may not appear on the CRO screen because of the directive pattern of the transmission from the transmitter to the phantom target and back to the receiving device as indicated in Fig. 4. However, with a sufficient number of tuning cycles, the optimum length spire will eventually appear.

In order to insure that the optimum length spire will appear in the cathode ray screen and that it will remain in a fixed position, thus giving a much brighter trace with which the operator may ascertain the distance of the reflecting object with greater certainty, the appartus of Fig. 5 utilizes an interconnected tuning device and scanning device. This not only insures that the spire occur at the same identical position in each scanning cycle, but also increases the brightness of the spire since it remains fixed in position on the screen. While in the apparatus of Fig. 1, there might be as many as fifteen tuning cycles during the progress of the cathode ray beam across the CRO screen with a corresponding number of pairs of spires, in the system of Fig. 5, it is preferred to have but a single pair of spires on the screen.

Figure 7:
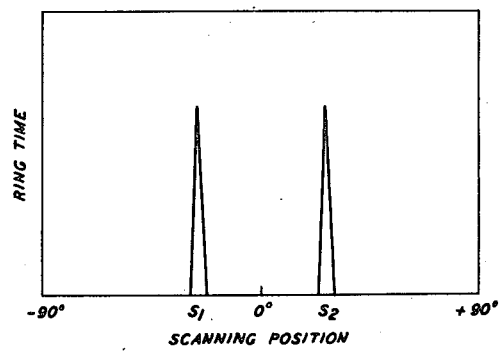
Fig. 7 is a graph explanatory of the operation of the apparatus of Fig. 5.

The variable tuning mechanism of Fig. 5 comprises a piston 37 within the chamber 24 and normally biased toward one end of the chamber by a spring 38 reacting against a collar 39 on the piston rod 40. The motion of the piston rod is determined by a roller follower 41 rotatably mounted between the arms of a yoke 42 at the end of piston rod 40. The roller 41 engages the outer periphery of a cam 43 carried at the upper end above shaft 30. A pair of lugs 90 integral with the cam 43 carry adjusting set screws cooperating with a stop boss 91 projecting laterally from the upper portion of the shaft 30 to enable the precise angular position of the cam 43 with respect to the shaft 30 to be determined and locked. It will be seen therefore that the motion of the piston 37 in undergoing one tuning cycle during a scanning cycle of the shaft 30 is very much slower than that of the piston 17 of Fig. 1. The two spires S1 and S2 in the tuning cycle are indicated in Fig. 7 which shows a screen of the cathode ray oscilloscope of Fig. 5. Inasmuch as these spires S1 and S2 fall at the same position on the screen for each revolution of the scanning mechanism, it is possible by utilizing persistence of vision techniques to obtain much clearer and more distinct traces on the oscilloscope, thus increasing the definiteness of the system and facilitating accurate and quick check-ups when the object locator is in motion. It is also possible, since the positions of these spires may be initially fixed with reference to a desired forward searching direction of the antenna 28 to use these spires as an indication of any drift or deviation in the azimuth biases of the oscilloscope and for correcting or adjusting the biases should occasion arise.

The tuning mechanism is provided with a latch 93 which is impelled by a spring to snap into position behind the collar 39 at the moment that the cam 43 and follower 41 displace the piston 37 to its extreme inward position. This immediately stops the tuning cycle operation, leaving the chamber 24 tuned to a frequency outside the range of the transmitter frequencies so as effectively to electrically disconnect it from the system. Closure of the testing key 21 serves to simultaneously energize motor 26 and solenoid winding 34 to release the latch and permit the tuner to operate as long as the key is depressed.

An adjusting collar 95 provided with oppositely directed internal threads may be introduced between separate aligned oppositely threaded portions of tuner rod 40 to permit manual adjustment of the length of the rod 40 when it is desired to shift the band of frequencies through which piston 37 tunes the chamber 24.

Figure 8:
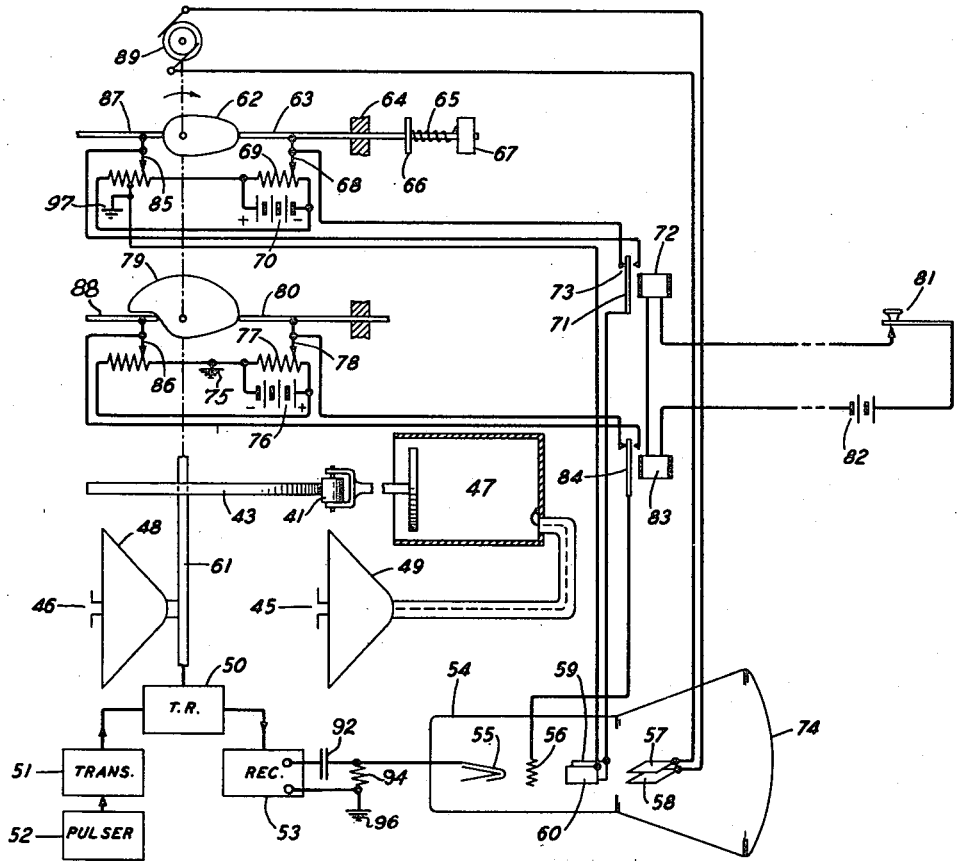
Fig. 8 is a partial line diagram of apparatus and a partial circuit diagram of the indicator controls of a modification of the system of Fig. 5.
Figure 9:
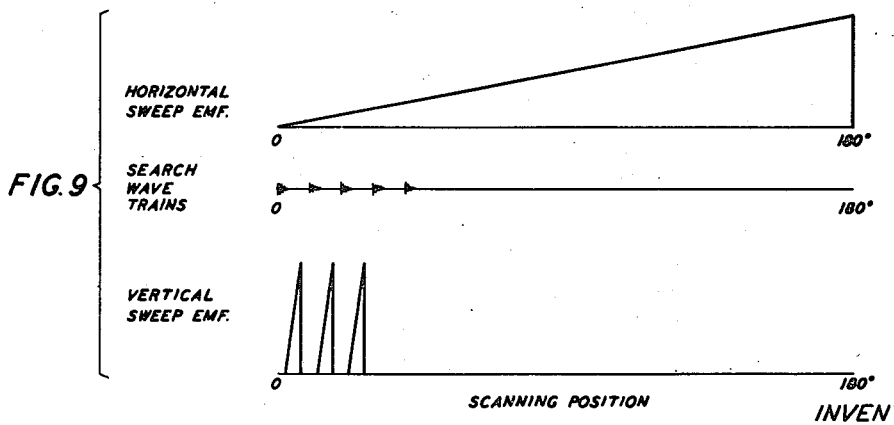
Fig. 9 shows graphs of the performance of the apparatus of Fig. 8.

In the modification of Fig. 8, the phantom target equipment is so correlated with the object locator equipment as to be operated during that portion of the scanning cycle in which, while the object locator antenna is operating for searching purposes, the oscilloscope is ordinarily blanked out. As shown in the figure, the fixed phantom target antenna 45 is placed at a position in the rear of the object locator antenna 46. The position is such that the antenna 45 and its associated reflector 49 are entirely out of the field of antenna 46 during the effective half of its scanning cycle which occurs when the reflector 48 is pointing toward the left as shown in the drawing and, hence, away from the antenna 45. This arrangement frees the transmitted scanning pulse pattern from any distortion which the antenna 45 and its reflector 49 might tend to introduce. It also improves the space condition since it enables the phantom target antenna 45 to be placed closer to the resonance chamber 47 and in a generally more convenient position in the airplane than out in front or at the side of the reflector 48. This tends, moreover, to reduce the losses occurring in the connections between the antenna 45 and the resonance chamber 47. Connected to the searching antenna 46, as shown diagrammatically is a system like that of Fig. 3 including a transmit-receive switch 50, a radio transmitter 51, a pulser 52 for exciting the transmitter, a radio receiver 53 and a cathode ray oscilloscope 54. The cathode ray oscilloscope is provided with the usual cathode 55, intensity-control grid 56, vertically deflecting plates 57 and 58 and horizontally deflecting plates 59 and 60. The radio receiver 53 is connected to the input or control circuit of the cathode ray oscilloscope over a circuit including the conventional blocking condenser 92 and shunt high resistor 94, the lower terminal of which is grounded at 96. In order to provide a linear horizontal sweep electromotive force for the plates 59 and 60, there is associated with the shaft 61 of the constant speed motor for rotating the scanning antenna 46, a cam 62 connected to the same shaft. A spring-driven cam follower 63 slidably mounted in a guideway 64 is impelled toward the cam by a compressed spring 65 placed between the collar 66 on the follower 63 and stationary abutments 67. The cam follower carries a contactor 68 engaging a potentiometer 69 which is connected across the terminals of a unidirectional source 70. The center of potentiometer 69 is effectively grounded and connected to deflecting plate 60 by means of the grounded center tap 97 of the potentiometer 85 which is in parallel with the potentiometer 69 and the source 70. Plate 59 is connected by way of armature 71 of the electromagnetic relay 72 and the contact 73 to the contactor 68. The cam 62 is so designed that when the contactor 68 is at its center position there is substantially no difference of potential between plates 59 and 60. As the shaft 61 rotates, the cam 62 permits contactor 68 to move along the potentiometer 69 in such fashion as to impress a linearly increasing sweep voltage between plates 59 and 60. This horizontal sweep electromotive force is indicated in the upper graph of Fig. 9. Accordingly, the beam from cathode 55 will tend to sweep in a horizontal direction across the face 74 of the oscilloscope upon which the illuminated trace appears. During each alternate half cycle of the rotation of the scanner shaft 61, this operation is repeated.

The vertical motion of the cathode beam occurs at a very much more rapid rate than does the horizontal motion. To provide this vertical motion deflector plates 57 and 58 are connected to the terminals of a pulsating current source 89 having a frequency which corresponds with that of the wave trains and having an intensity which is substantially zero at the instant of emission of a wave train and which increases linearly with elapsed time so that the vertical position of the cathode beam at any instant is a function of the time which has elapsed since the emission of the wave train. The second graph of Fig. 9 indicates the sequence of search wave trains and the third graph the coincident vertical sweep electromotive forces supplied by the source 89 and which persist for a substantial part of the period between wave trains. It will, therefore, be seen that the scanning occurs in the manner of a rapid vertical pulsation which moves slowly in a lateral direction accomplishing a horizontal traverse of the screen 74 during the half cycle of rotation of the shaft 61. The intensity of the cathode ray beam from cathode 55 is normally such that in the absence of energization of the receiver 53, the trace on the screen 74 is just invisible. Whenever the receiver 53 is energized, it impresses a potential on the cathode 55 sufficient to cause the trace to appear as a glowing spot if energization is instantaneous and at one position only, or as a line if it reoccurs at closely spaced instants. Included in the circuit between cathode 55 and grid 56 is a blanking source 76 associated with a potentiometer 77 and a cam-driven contactor 78 provided with biasing springs not shown and actuated by a cam 79 also mounted on the scanner shaft 61. Cam 79 is so designed that during the scanning half cycle it maintains contactor 78 in the position shown in Fig. 8 so that no blanking potential is impressed by the source 76 upon the intensity control circuit. However, at the end of the half cycle, the follower 80 passes suddenly from the larger radius portion of the cam 79 to the smaller radius portion instantly moving contactor 78 to the left-hand terminal of potentiometer 77 to impress upon the grid 56 such a negative bias potential as to entirely blank out the trace on the oscilloscope screen 74 during the ensuing half cycle irrespective of the strength of the signals incoming to radio receiver 53 during that half cycle. As the shaft 61 again reaches the position at which the reflector 48 is facing forward, the blanking potential is removed from the grid 56, thus enabling the searching half cycle to be repeated.

Should the operator at the remote control position desire to make a test of the equipment he may close key 81 in series with a local source 82 and the windings of electromagnetic relays 72 and 83. The effect of this operation is to actuate armatures 71 and 84 to effectively disconnect the contactors 68 and 78 and to connect in their stead contactors 85 and 86 actuated by diametrically opposed followers 87 and 88 respectively. The operation of the armature 71 serves to transfer the positive horizontal sweep electromotive force from the forward portion of the scanning cycle to the rearward portion since the follower 87 undergoes exactly the same kind of motion as the follower 63 but at a half cycle later in time. Similarly, the operation of the armature 84 serves to transfer the application of the blanking potential from source 76 to the forward half of the scanning cycle, thus permitting the oscilloscope 54 to be actuated by the receiver 53 only when the reflector 48 is pointing rearwardly and hence is in position to direct wave trains toward and to receive echoes from the phantom target resonator 47. The screen 74 of the oscilloscope may be calibrated to indicate when the reflector 48 is pointing directly to the rear thus providing the same sort of check with reference to the oscilloscope biases as is described in connection with the operation of Fig. 5. The indication on the screen 74 may be in every respect identical with that on the screen shown in Fig. 5 with the advantage that there is no confusion from actual targets or objects in front of the equipment since energy reflected from surfaces in front of the equipment is blanked out. It will be understood that the details of the variable tuning device of the resonance chamber 47 may be identical with those of the tuning equipment of Fig. 5.

What is claimed is:

1. A radio pulse transmitter and a pulse echo receiver having a common directive antenna the directivity of which may be varied to scan a zone in space, a testing equipment having an antenna positioned within the zone to receive energy from the directive antenna during scanning of the zone by the directive antenna, means for tuning the testing equipment to cause it to selectively respond to received energy and a common driving means for simultaneously varying the directivity of the directive antenna and the tuning of the testing equipment.

2. An antenna mounted on a rotatable support, means for continuously driving said antenna to cause it to rotate, an electrical resonance chamber, an electromagnetic wave pick-up device connected to said chamber and mounted in position to exchange energy with said antenna during at least a portion of the revolution of the antenna and means controlled by said antenna driving means for varying the resonance frequency of said resonance chamber.

3. A spinner antenna mounted for revolution about an axis, means for causing said antenna to revolve about said axis, means for causing said antenna to emit recurrent pulses of a substantially constant frequency, a space resonance chamber electrically coupled with said antenna to receive energy therefrom and means for causing the tuning of the chamber to vary cyclically in synchronism with the rotation of said antenna about its axis.

4. A radio echo measuring system comprising a pulse transmitter, a pulse echo receiver, an antenna connected to said transmitter and said receiver to transmit outward directed pulses and inward directed pulse echoes, means for driving said antenna to cause it to successively scan a series of positions in cyclic manner, a phantom target positioned near said antenna to receive outgoing pulses and to return pulse echoes, said target comprising an electrically resonant system having a tuning device and means operated by said antenna-driving means for operating the tuning device in synchronism with the scanning operation of the antenna.

5. A directive radio antenna, a rotatable shaft on which said antenna is mounted, a pulse transmitter and a pulse receiver, means for alternately connecting said transmitter and said receiver to said antenna, a phantom target system comprising a tunable resonance chamber having a transducer radiator exposed to the field of said antenna, a tuner for said chamber connected to said shaft to be operated thereby and a motor connected to said shaft for maintaining it in operation whereby the tuning of the chamber and the position of the antenna are concurrently varied.

6. In combination, a motor, a shaft driven in rotary direction thereby, a directive antenna carried by said shaft, a resonance chamber having an external radiant energy transducer mounted in position to transmit energy to or receive energy from said antenna in certain of its positions, a cam on said shaft, said resonance chamber having a movable tuner engaging said cam to vary the tuning of the chamber with change in the position of the directive antenna.

7. A system for transmitting pulses of radiant energy and for receiving pulse echoes comprising a radio transmitter, a radio receiver, a directive antenna connected to said transmitter and receiver, a motor for impelling said antenna through a series of different directive positions, a tuned reflecting system for selectively receiving the energy of a transmitted pulse and for reradiating an echo pulse, tuning means operated by said motor, and remote controlled means connected to said tuning means and said reflecting system to permit disconnecting said tuning means from the motor and rendering said reflecting system ineffective at will.

8. In combination, a scanner mounted for rotation about an axis to enable scanning in all directions about the axis, an indicator device connected to the scanner to receive energy therefrom, means for blanking operation of the indicator device during a sector of the cycle of rotation to limit the indications to a given sector of rotation, a test apparatus mounted in the area of the blanked sector and means connected to the blanking means and controllable at will to unblank the blanketed sector to permit scanning the test apparatus, said means operating at the same time to blank the sector previously unblanked and scanned.

CHARLES W. SCHRAMM.

REFERENCES CITED

The following references are of record in the file of this patent:

UNITED STATES PATENTS

| Number | Name | Date |
| --- | --- | --- |
| 2,241,918 | Muller | May 13, 1941 |
| 2,306,282 | Samuel | Dec. 22, 1942 |
| 2,377,902 | Relson | June 12, 1945 |
| 2,396,112 | Morgan | Mar. 5, 1946 |
| 2,402,410 | Kear | June 18, 1946 |
| 2,460,827 | Isely | Feb. 8, 1949 |

FOREIGN PATENTS

| Number | Country | Date |
| --- | --- | --- |
| 149,826 | Great Britain | Aug. 26, 1920 |